US012064892B2

(12) United States Patent
Maletich et al.

(10) Patent No.: US 12,064,892 B2
(45) Date of Patent: Aug. 20, 2024

(54) MULTI-FUNCTIONAL DOCUMENT BINDING DEVICE

(71) Applicant: FELLOWES, INC., Itasca, IL (US)

(72) Inventors: Peter Maletich, Vancouver, WA (US); Tai Matlin, Round Lake Beach, IL (US)

(73) Assignee: FELLOWES, INC., Itasca, IL (US)

( * ) Notice: Subject to any disclaimer, the term of this patent is extended or adjusted under 35 U.S.C. 154(b) by 180 days.

(21) Appl. No.: 17/582,758

(22) Filed: Jan. 24, 2022

(65) Prior Publication Data

US 2022/0234239 A1 Jul. 28, 2022

Related U.S. Application Data

(60) Provisional application No. 63/140,593, filed on Jan. 22, 2021.

(51) Int. Cl.

| | |
|---|---|
| ***B27F 7/30*** | (2006.01) |
| ***B26F 1/04*** | (2006.01) |
| ***B26F 1/14*** | (2006.01) |
| ***B42C 1/00*** | (2006.01) |
| *B42B 5/10* | (2006.01) |
| *B42B 5/12* | (2006.01) |

(52) U.S. Cl.

CPC .................. *B26F 1/04* (2013.01); *B26F 1/14* (2013.01); *B27F 7/30* (2013.01); *B42C 1/00* (2013.01); *B26F 2210/02* (2013.01); *B42B 5/103* (2013.01); *B42B 5/123* (2013.01)

(58) Field of Classification Search

CPC .. B42B 5/10; B42B 5/103; B42B 5/00; B42B 5/08; B42B 5/12; B42B 5/123; B26F 1/02; B26F 1/04; B26F 1/14; B26F 1/32

USPC ............... 412/18, 33, 34, 38, 39, 10, 42, 43; 83/687, 691; 270/58.07, 58.08

See application file for complete search history.

(56) References Cited

U.S. PATENT DOCUMENTS 5,090,859 A * 2/1992 Nanos ........................ B42B 5/10 281/21.1
5,211,522 A 5/1993 Ho
(Continued)

FOREIGN PATENT DOCUMENTS

EP 864440 A1 * 9/1998 ................ B26F 1/04

OTHER PUBLICATIONS

International Search Report and Written Opinion mailed Apr. 13, 2022 in International Patent Application No. PCT/US2022/013517.

*Primary Examiner* — Leslie A Nicholson, III
(74) *Attorney, Agent, or Firm* — Wood, Phillips, Katz, Clark & Mortimer

(57) ABSTRACT

The device disclosed herein is a device for performing binding functions such as stapling, hole punching, and comb binding. The device includes a housing, lid, slots for receiving sheets of material to be operated on by the punching and biding assemblies of the device. The device includes a lid to close off or inactivate portions or functions of the device and direct or guide the operator to the proper function or assembly to use for the operation. The device further includes an actuator that selectively operates functional assemblies of the device. The device may further include a moveable guide to selectively offset the punching assembly when larger dimensional covers are punched. The device may also include punching die assemblies that are easily moved and aligned from one position to another.

20 Claims, 9 Drawing Sheets

(56) References Cited

U.S. PATENT DOCUMENTS

| | | | | |
|---|---|---|---|---|
| 5,431,519 | A * | 7/1995 | Baumann | B42B 5/103<br>412/38 |
| 5,934,340 | A | 8/1999 | Anthony, III et al. | |
| 6,527,016 | B2 * | 3/2003 | Todaro | B42B 5/123<br>412/38 |
| 7,314,340 | B2 * | 1/2008 | Chiang | B42B 5/103<br>412/38 |
| 8,047,523 | B2 * | 11/2011 | Terao | G03G 15/6552<br>270/58.11 |
| 8,475,105 | B2 * | 7/2013 | Coric | B42B 5/103<br>412/14 |
| 10,481,544 | B2 * | 11/2019 | Yoshida | H04N 1/00639 |
| 11,027,567 | B2 * | 6/2021 | Sugiyama | B31F 5/02 |
| 2009/0218381 | A1 | 9/2009 | Holt et al. | |
| 2011/0150605 | A1 | 6/2011 | Szoke et al. | |

* cited by examiner

MULTI-FUNCTIONAL DOCUMENT BINDING DEVICE

BACKGROUND OF THE INVENTION

Field of the Invention

The present invention relates to binding machines, office document binding machines in particular.

Background Art

Office binding machines utilizing plastic binding combs, metal binding combs, and spiral binding, and the corresponding punch apparatus are well known and utilized to create multipage bound documents for a variety of uses such as presentation materials, instructional manuals, and corporate or project reports are only a few of a multitude of bound document examples created by these types of machines. Typically, these types of machines are specialized and are only utilized for the purpose of binding and for a particular type of comb or binding spine such as the Swingline C340 CombBind Binding Machine.

There are non-typical machines which endeavor to combine the comb binding mechanisms into one machine by way of a complex array of punching dies, comb spreaders and crimpers utilizing a complex array of punching dies and actuation levers, making an already complex task even more complex, such as the Akiles DuoMac-421 Heavy Duty 2-in-1 Punching and Binding Machine. Still other machines are designed to utilized one main binding method and the needed support mechanisms while adding the additional capability of round hole punching for ring binding of which Tamerica 213B combination Punch & Bind Machine is an example. While these types of machines attempt to bring value, they utilize features which are more and more seldom utilized while aggravating the situation further by adding additional complexity above and beyond a more basic machine. Therefore, office workers which are not familiar or comfortable engaging with even a basic binding machine will engage these more complex machines even less, making them even more underutilized.

FIG. 1 is a photograph of a prior art multi-function binding machine, Akiles DuoMac-421 Heavy Duty 2-in-1 Punching and Binding Machine. The support literature states the machine combines two different types of binding in one single machine. The machine includes two independent punching dies sets with custom configuration.

FIG. 2 is a photograph of a prior art multi-function binding machine, Tamerica 213B combination Punch & Bind Machine. The support literature states the machine is a 2-in-1 Plastic Comb and Spiral-O wire-binding machine. This machine has 21 disengaging dies as well as a dedicated 3-hole punch.

FIG. 3 is of FIG. 12 from U.S. Pat. No. 5,007,728 titled "Combined Paper Punch and Binding Apparatus." In the Abstract section of the patent, it describes the apparatus having two punch mechanisms, one for punching round holes in paper sheets stack, and one for punching rectangular holes in another paper sheet stack along with a single layer or crank simultaneously operates and drives a series of round end punches as well as a punch plate with integral rectangular punch elements. In the preferred embodiment of the invention, a binding stating is provided for Douvry-type plastic resilient loops binding element which is operated by operating knob 24. In another stated embodiment, two rows of large and smaller diameter punches are provided in one round punch mechanism with an apertured translatable bar (not shown) rendering inoperative one or the other of the rows of punches.

FIG. 4 is of FIG. 4 from U.S. Pat. No. 5,187,634 titled "Punch Selectable Punch Press." In the Abstract section of the patent, it describes a punch mechanism with a selector rail which by shifting can change the punch hole pattern by activating or deactivating select punches along the rail. In particular the activating and deactivating two select punches. In summary, by engaging and moving slidable rail 100, punch 60 and punch 66 would be disengaged while punch 64 would be engaged allowing for 2-hole punching. In the alternative actuation, slidable rail 100 would engage punch 60 and punch 66 while impeding 64 allowing for 3-hole punching with a selector lever (not shown) extending through a cover and selectively operable by a user.

SUMMARY OF THE INVENTION

In this application, the disclosed invention, "Multi-Functional Document Binding Device", addresses the addition of useful features within a document binding device, while clarifying and therefor simplifying the processes when engaging the machine's functions as to make it inherently more operator friendly. In its simplest embodiment of the device, it is inclusive of the mechanisms and functionality needed to bind a document, including a paper stack punching device along with the corresponding binding mechanism which aligns to the punching pattern of the main device (plastic comb, wire comb, spiral comb) with the additional capability to modularly add additional functionality its original base functionality. In an alternative embodiment, we are disclosing a device with built-in multifunctionality uniquely executed in a way as to encourage an operator to engage with it on a more daily basis as to familiarize themselves over time with the devices additional capabilities including the seemingly more intimidating functionalities. Furthermore, we are disclosing features which simplify the operator's perceived device operational processes even with the additionally added elements by the use of transforming elements which aid in the operator's determination of which functions and processes are accessed in what order and what time for a particular desired outcome when utilizing the device and its systems.

The most common binding machines or devices in an office environment utilize plastic or wire expanded combs, and plastic or wire spiral combs. Other forms of binding which include adhesive, thermal and non-thermal, and sewn are known, but are not as commonly used in the office environment and therefor they will not be described in detail within this application, but are not excluded as possible binding methods which can be incorporated within the disclosed embodiments of the disclosed device and system. Less typically, some binding machines simply conjoin or lump some of the differing comb binding capability into one main machine as ways to add additional value to the purchaser and or operator of the device. These types of devices, of which an exemplary machine is shown in FIG. 1, exemplify the typical complexity of mechanisms and levers needed when conglomerating all the punching stations, punching die engagements, and the comb actuations needed to cover the variety of combs and variables without much thought for ease of use for the operation of such a device.

Furthermore, our research has confirmed that office workers needing to create presentation material find binding machines to be difficult to use and not intuitive, and therefor instruction is typically needed to understand the inherently complex array of procedure, processes and consumables which work with a particular machine. Our research further confirmed that many office workers resorted to other more familiar and therefore easier methods of creating bound documents including stapling and ring binding. Due to these research findings, we endeavored to solve these unmet needs by creating a unique binding device which incorporates these less complex binding methods within an office binding machine therefore inducing more engagement and familiarity with the machine as to make it approachable when the operator needs to engages the seemingly more complex functions of the machine when wanting to create more sophisticated bound documents.

We are disclosing a device which modular engagements and an actuation or controlling means through the use of a primary actuator, which can be either manual, motorized and or motor assisted. This feature allows for punching in a multitude of punching stations utilizing a primary actuator of which when engaged, can actuate secondarily actuated sub-assemblies, or modularly added stations as well. For example, the main actuator can be utilized to punch square holes for plastic combs in one station, and round holes in another, while actuating the comb crimping, and or comb spreading actions at yet another station along with other additional actions. The primary lever simplifies the process for the operator since they only need to engage the primary lever for multiple tasks vs. the typical one lever for each task needed. When motorized, there can be a sensor or an array of sensors to detect when a given task is engaged by the recognition or lack thereof of an element to engage and the corresponding communication to the user by visual or audio means. Even if it's found to be advantageous to consolidate the lever actuators into several vs. one primary actuator with, or without sub-actuations, whether automatic or semi-automatic, we are disclosing within this application how to actuate greater than one, a multitude of actions either at once or sequentially when reconfiguring the device for a given purpose.

For binding devices utilizing plastic, wire, and spiral combs, typically include a stack punch operation which allow for a stack of paper to be punched along its edge. The punch feature punches the corresponding holes along that edge to accommodate the shape of the particular comb style the machine has been designed for. In a proposed embodiment of the invention, the device has, but not limited to two primary document ingress slots, with one or both allowing access to the optionally integrated and interchangeable, movable and or selectively engageable punch dies. One of these document ingress slots would allow that particular slot to be set up for a specific purpose, such as for round hole punching of the inserted documents for use in more simple three ring binders, while leaving the other available ingress slot or slots, to be set up for another purpose such as square hole punching for use with plastic comb binders. The disclosed device meets our objectives through the use of a manual and or auto-transforming elements which allow access to certain features while restricting access to others in an effort to guide the operator through the more sequentially relevant and compatible procedures vs. allowing access to features which are not compatible nor sequentially relevant and therefor creating more waste of materials and time due to vague device operations and general procedural confusion during the binding and assembly processes.

In solving the previously stated issues, when accessing the round three-hole punch feature on an exemplary embodiment of the disclosed invention, the comb binding elements are covered by a lid which is in the lowered or down position. The lowered position allows operational access to the three-hole punch ingress slot while covering the comb binding station/feature including the comb punching ingress slot as to prevent inadvertent square punching along the document edge when round punching is desired. In the exemplary alternative, when wanting to comb bind, the lid on the device would be up allowing access to the square punch ingress slot and the plastic comb spreading station, which are compatible and sequentially relevant to those processes, while preventing access to the round three-hole punch ingress slot which is not. Other means can be utilized to ensure only compatible and sequentially relevant features are accessible during particular steps are, but not limited to regulating accessibility to certain pertinent consumables by latching the access to them on and off (lock and unlock) depending on which step you are in the process of binding, or which binding method the device is set up to execute. Still other actions could be slide engagements to allow the main lever arm to actuate one mechanical step while not engaging others, visual indicators could also be sequentially activated mechanically or electro mechanically by each prior step as to help instruct the device operator of the next step and or which consumable to utilize when. User selectable engagements as well as auto and semi-automatic transformations when reconfiguring the device which allow for selective activation of actions such as but not limited to punching, stapling, spine comb crimping, spin comb spreading and closing and coil spinning as well as sub actions, such as but not limited to certain punch dies, paper stack insertion access, accessory doors and cover sheet offsets are all disclosed within this application.

It was noted during further research along with usage studies, alignment of punches and or the holes they create when attempting to utilize cover and back sheets within the multi-page bound documents is difficult at best. In this application, we disclose unique alignment mechanisms for cover sheets (both front and back) vs. the pages in-between those covers. This is accomplished by the use of a bias spring alignment mechanism which can be moved out of the way to accommodate a cover and the corresponding back spacing variance when punching (allowing a uniform border) and then returns to the default spacing after punching is complete which reduces operator setting error saving time and material waste. Along with this solution, we further disclose a punch alignment arrangement which allows for visual confirmation of the setup to ensure proper alignment whether it is to duplicate a previously punched set of papers allowing the capability to easily add additional sheets to an existing document or to ensure the new setup aligns to accommodate the family look of an entire array of documents. This alignment arrangement allows for visual confirmation, adjustment control, while ensuring precise repeatability.

We are further disclosing improvements within the machines and processes which add additional performance and ease of use elements to improve the modular and or integrated features within the device along with pertaining supportive accessories which enhance the appearance, functionality and output quality of the documents being processed by way of the disclosed device.

FIG. 5 is a simplified chart summarizing some of our research findings and the objective of the present invention and how the improvements to the prior art brings benefits to the operator of the disclosed device. The chart going from left to right represents various processes of creating multi-page bound documents going from the simpler to the more complex. The prior art multi-functional binding machines reside within the most inner dotted line rectangle with most unit's functionality being in comb and wire binding functions with a limited number combining two and three-hole punching along with binding. The present invention represented by the larger outer dotted line rectangle endeavors to bring in additional features from the more commonly used staple feature (from our research office workers are 6-7 times more likely to staple vs. comb bind) to a higher level of finishing capability by include die cutting, rounding corners, and embossing/debossing features. Due to these reasons, the chart shows a larger footprint captured by the present invention as compared to the prior art machines while capturing the concept that certain additional features create more daily interaction with the device which encourages familiarity and comfort with the device over time.

As disclosed herein, described and illustrated, the invention can be applied to a wide array of devices and machines which punch, staple, emboss, decorate and bind documents for presentations and should not be limiting by the disclosed embodiments within this document in any way. To the contrary, the present disclosure is intended to encompass all modifications, alterations, substitutions within the spirit and scope of the disclosed inventive features.

In one form, the invention is directed to a device for performing operations on sheets of material. The device includes a housing having a first receiver for sheets of material for a first operation and a second receiver for sheets of material for a second operation, and a lid having a first position and a second position. The first receiver is open to receiving sheets when the lid is in a first position. The second receiver is open to receiving sheets when the lid is in a second position.

In one form, the lid blocks the second receiver from receiving sheets when the lid is in the first position.

In one form, the first operation is performed by a stapler.

In one form, the second operation is performed by a hole punch.

In one form, the second operation is performed by a binding hole punch.

In one form, the device further includes a drawer within the housing. The drawer is prevented from opening when the lid is in the first position.

In one form, the hole punch includes a punch die assembly. The punch die assembly has a plurality of dies slidably coupled to an assembly rail. The dies are coupled to move in unison when the die positions are changed along the assembly rail.

In one form, the first receiver is a slot bounded by the lid and a surface of the housing.

In one form, the first operation is actuated by an actuator at a first time. The second operation is actuated by the actuator at a second time.

In one form, the second receiver includes a cover spacing guide. The cover spacing guide has a first position to guide a stack of paper and a second position to guide a cover for the stack of paper. The cover spacing guide moves from the second position to the first position after the binding hole punch is activated.

In one form, the invention is directed to a device for performing binding operations on sheets of material. The device includes a housing, a lid, a first slot for receiving stacks of material to be bound, and a second slot for receiving material to be punched. The lid covers the second slot when the lid is in a closed position and exposes the second slot when the lid is in an open position.

In one form, the lid includes a recess. A stapler is positioned in the recess.

In one form, the device further includes a stapler in communication with the first slot and a hole punch assembly in communication with the second slot. An actuator is coupled to the stapler to actuate stapling and also coupled to the hole punch assembly to actuate punching.

In one form, the actuator actuates the hole punch when the lid is in the open position.

In one form, the device further includes a drawer in the housing. The drawer is openable when the lid is in the open position and not openable when the lid is in the closed position.

In one form, the second slot has a guide for positioning the sheets of material in the slot. The guide has a first position and a second position. The guide is movable from the first position to the second position by the user. The guide moves back to the first position upon punching of the sheets of material in the slot and the removal of the sheets of material from the slot.

In one form, the hole punch includes a punch die assembly. The punch die assembly has a plurality of dies slidably coupled to an assembly rail. The dies are coupled to move in unison when the die positions are changed along the assembly rail.

In one form, the invention is directed to a device for binding sheets of material. The device has a housing and a lid having an open position and a closed position. A first slot is in communication with an assembly for a first operation on the sheets of material. A second slot is in communication with an assembly for a second operation on the sheets of material. A third slot is in communication with an assembly for a third operation on the sheets of material. The lid and portion of the housing form the first slot. The lid closes the second slot when in the closed position. The third slot is blocked by the lid when the lid is in an open position.

In one form, the assembly for the first operation, the assembly for the second operation, and the assembly for the third operation are all actuated by the same actuator.

In one form, the actuator acts to actuate the first assembly when the lid is in the closed position. The actuator acts to actuate the second assembly when the lid is in the open position.

DETAILED DESCRIPTION OF THE PREFERRED EMBODIMENT

Figure 1:
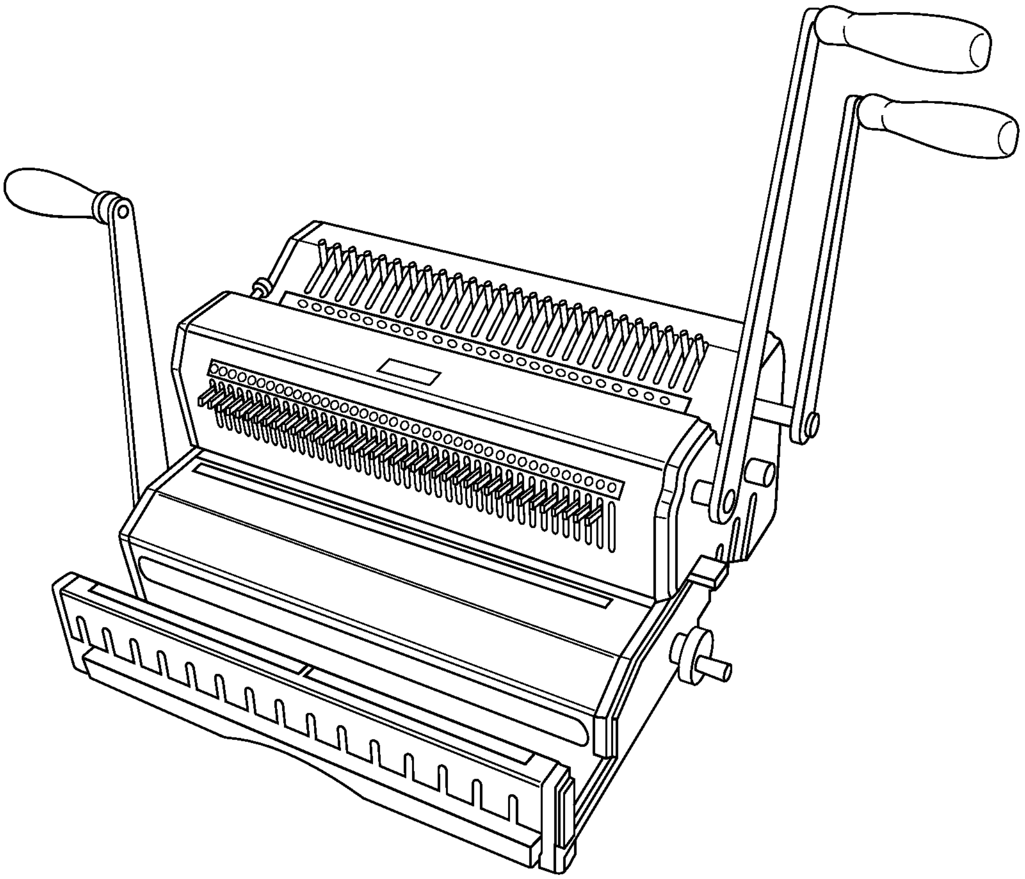
FIG. 1 is a representation of a prior art multi-function binding machine.
Figure 2:
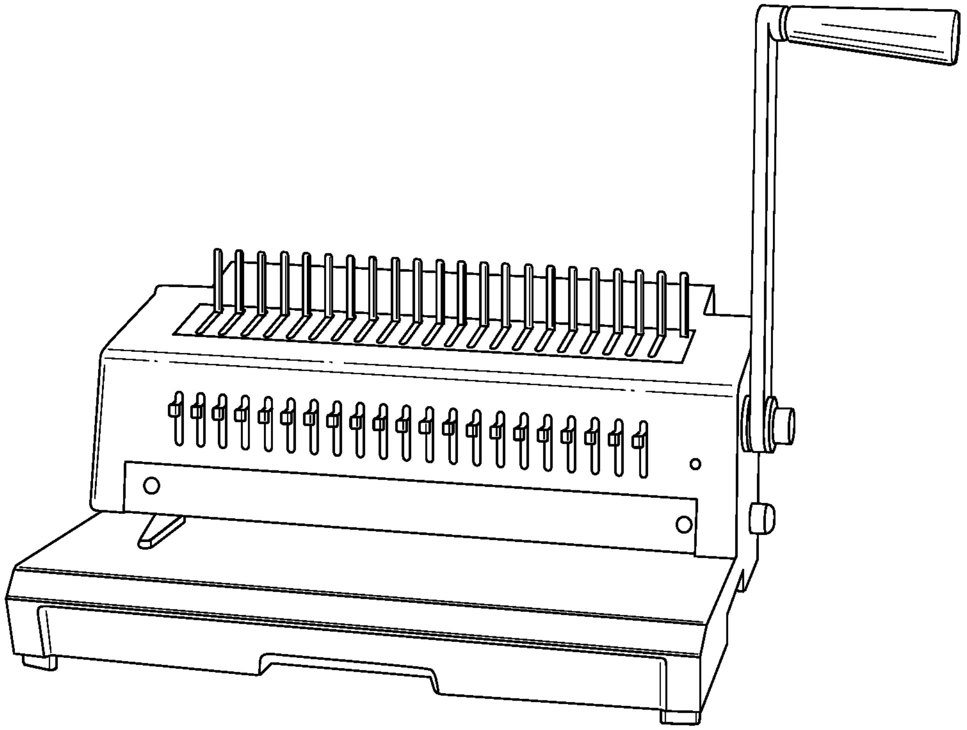
FIG. 2 is a representation of a prior art multi-function binding machine.
Figure 3:
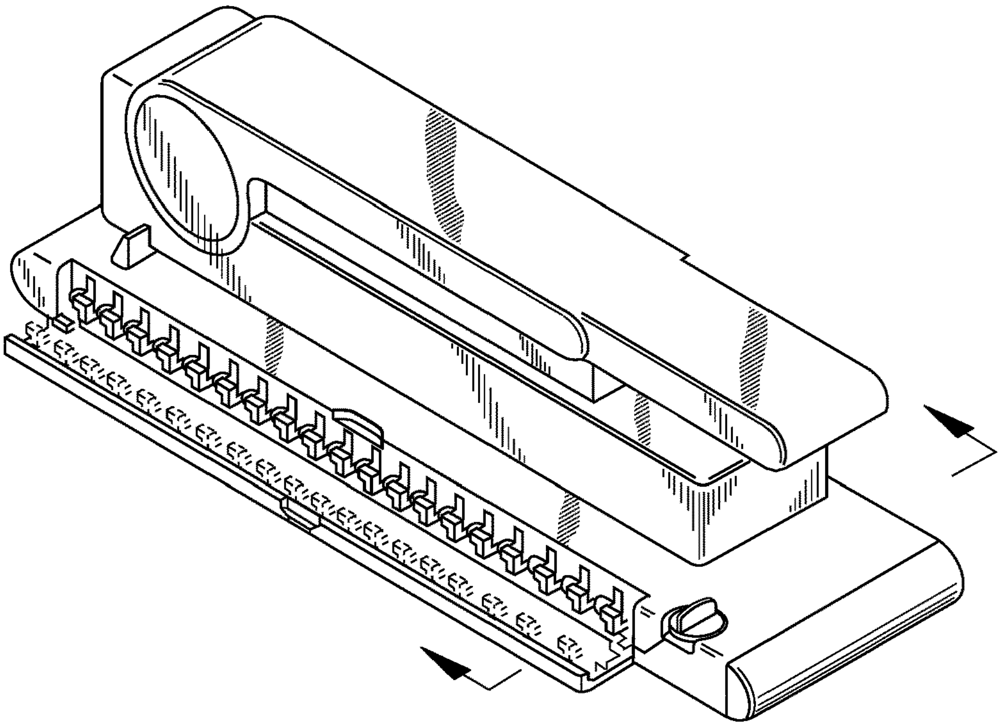
FIG. 3 is of FIG. 12 from U.S. Pat. No. 5,007,728 titled "Combined Paper Punch and Binding Apparatus."
Figure 4:
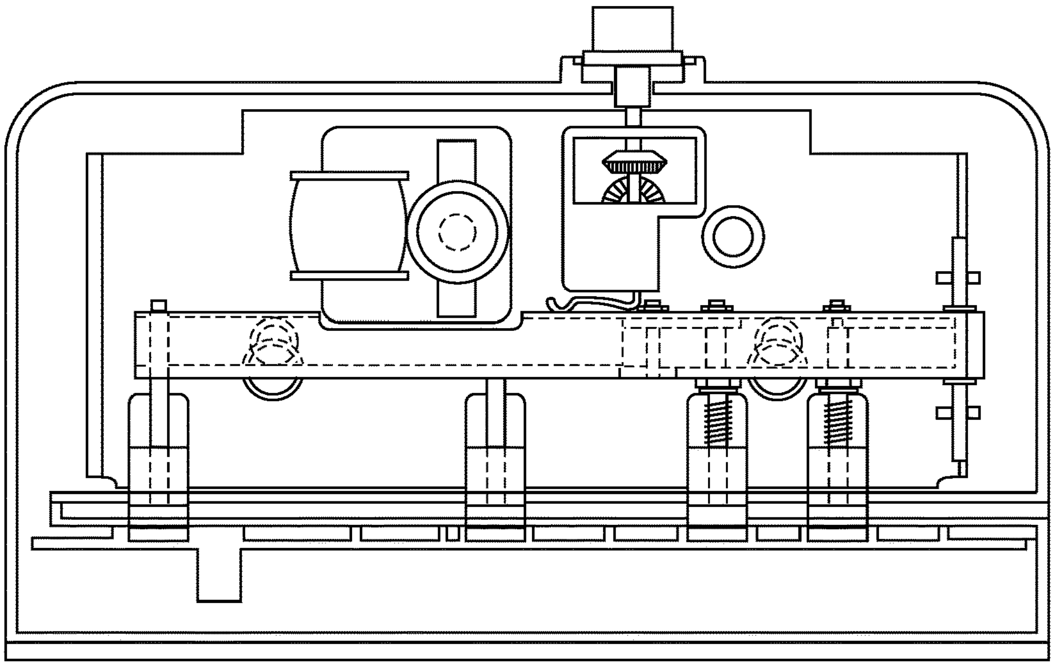
FIG. 4 is of FIG. 4 from U.S. Pat. No. 5,187,634 titled "Punch Selectable Punch Press."
Figure 5:
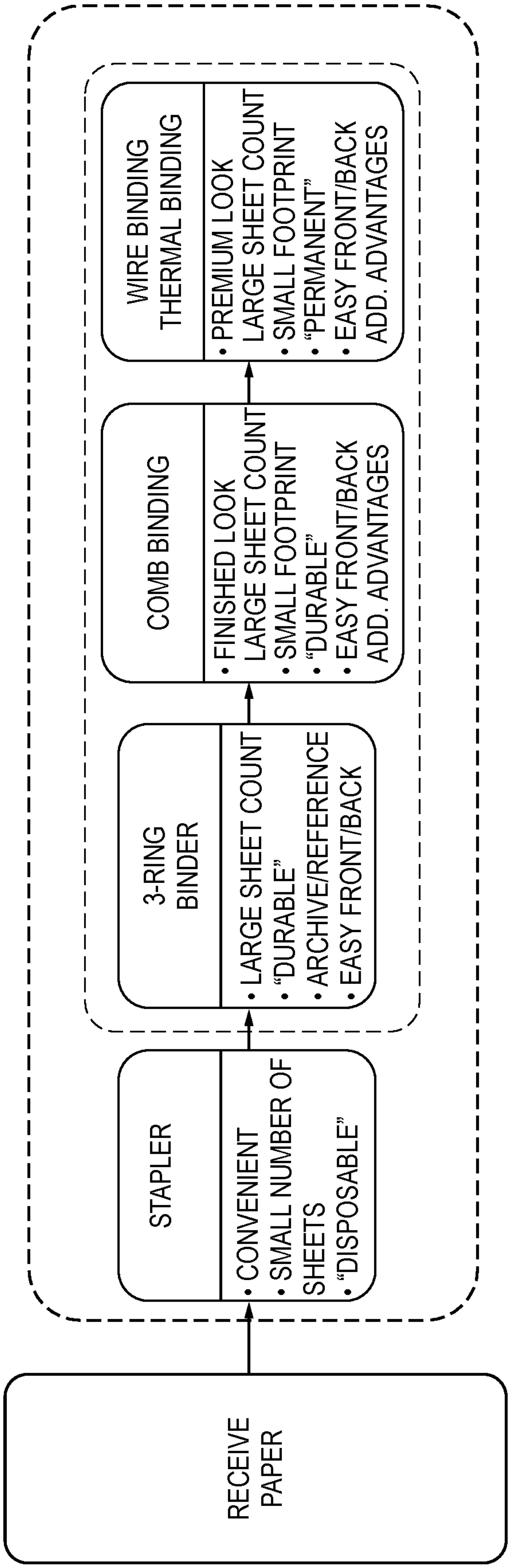
FIG. 5 is a simplified chart summarizing some of our research findings and the objective of the present invention and how the improvements to the prior art brings benefits to the operator of the disclosed device.
Figure 6:
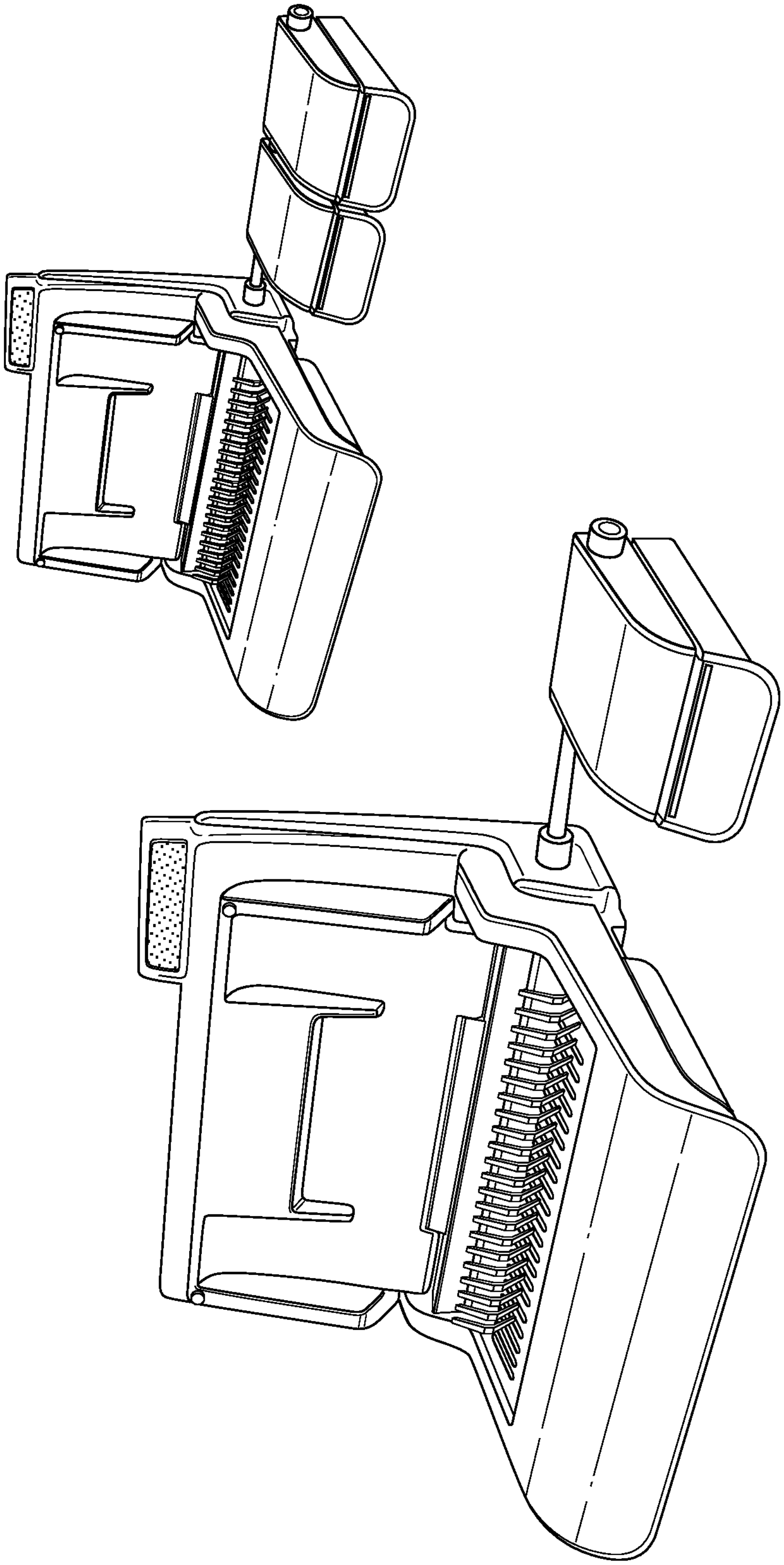
FIG. 6 is a representation of an embodiment of the stated invention utilizing modular functional additions, including an option of interlinked modules.

FIG. 6 represents an embodiment of the stated invention utilizing modular functional additions. The Figure shows the binding machine having a rotational drive shaft, and an optional connection collet assembly, which is actuated manually by use of the handle, or alternatively a motorized assembly with an electro-mechanical actuation or controls means if the binding machine is of the automatic type. In some embodiments, the drive shaft extends outwardly from the pivot point of the handle or other actuator. In other embodiments, the shaft extends from the body or housing of the binding machine at a location other than the pivot point of the handle or other actuator. The drive shaft rotates the collet assembly which is connected to and acts upon the mechanisms of the connected or interlinked modules. The interlocking drive collet allows for the addition of modules such as an Embossing or Die-cutting module shown in FIG. 6 (depending on its inserted interchangeable die) to be added and actuated by the same drive collet located on the machine as shown in the foreground. In other embodiments, such as the interlined modules shown in in the background of FIG. 6, the figure shows the same binding machine, with a plurality of modules added whose features and actuations are driven and/or controlled by the handle or motorized assembly of the binding machine. In the embodiment, the plurality of modules are coupled to the drive shaft of the binding machine. In the represented embodiment, the rotational drive shaft can be placed either on the left or right or both sides if maximum flexibility is required. This type of arrangement as shown would allow the base binding machine to stay lower in cost and only the additional desired features then would be modularly added. Since these modular additions could be driven by the main unit's actuation and drive method, the cost of these additional modules will be lower as well. Other embodiments are not precluded, which would include fully functional modules (motorized and manual versions) which can function on their own by the inclusion of a drive device (handle or motorized assembly) to actuate and drive its functions separately from or in unison with the main unit's actuation, controller, and drive methods. In some embodiments, the additional modules may be drivable by an attachable handle or other actuator attached to a collet of module, thus making the module independently drivable and not reliant upon the base binding machine and its actuator or handle.

Figure 7:
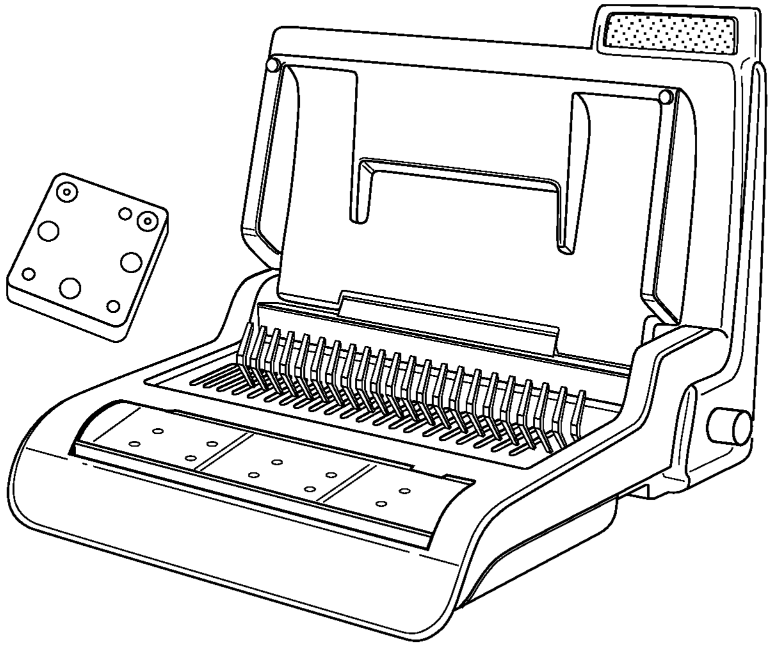
FIG. 7 is a representation of an alternative embodiment of the stated invention utilizing modular functional additions within the main machine, such as selectable dies to emboss or die-cut.

FIG. 7 represents an alternative embodiment of the stated invention utilizing modular functional additions within the main machine. In some embodiments, the binding machine may include an accessory cavity to receive an accessory. In some embodiments, the accessory may be a die for embossing or die-cutting. The Figure shows the binding machine having a rotational drive mechanical assembly actuated by the handle, or motorized assembly of the machine if the binding machine is of the automatic type. The Figure shows a receptacle area with an optional lift lid in which the addition of modules such as an embossing or die-cutting (depending on the inserted interchangeable die) module to be added and installed as to be actuated by the same or alternative drive assembly of the main machine. In other embodiments, other accessories may be received and operably connected to the actuator or handle for operation of the accessory. An opening or slot in the machine's housing would allow the paper to be inserted and processed by the machine's mechanical actuator. This type of arrangement as shown would allow the base binding machine to be sold with or without the additional feature installed and the end user would determine and add which additional features are desirable. In the alternative, the unit could be sold fully-featured inclusive of additional die cut, emboss and debossing features of differing types and shapes, to name a few of many possibilities. Customized shapes such as corporate logos or seals, could be additionally obtained if desired. Other embodiments are not precluded, which could include a mixture of integrated options either installed or modularly added and or replaceable or interchangeable within, adjacent to, or separate from the existing machine.

Figure 8:
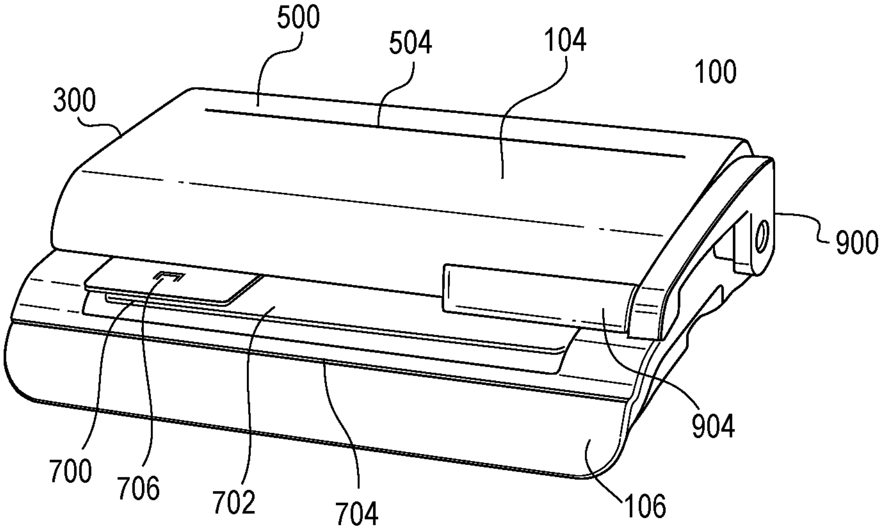
FIG. 8 is a representation of an alternative embodiment of the stated invention utilizing an optional modular and or built-in functional addition or a plurality of additions

FIG. 8 represents an alternative embodiment of the stated invention multi-functional document binding device 100 utilizing an optional modular and or built-in functional addition or a multitude of additions. This embodiment of the stated invention discloses stapling assembly 700 residing within accessory cavity 702 of binding device 100. As to reduce user confusion, the document binding feature is not accessible when device lid 104 is in its lowered position but allows the operator access to the staple assembly 700, and stapler lever 706. In some embodiments, the staple assembly cannot be active for stapling when the device lid 104 is in an open position.

For stapling, when a stack of paper is place within optionally adjustable guide rail 704 and slid into place, stapler lever 706 is actuated to insert the appropriate binding staple into the paper stack. In some embodiments, the staple assembly 700 may be activated to staple the stack of paper by the actuation handle 904. Actuation handle 904 may also be used for other operations, such as hole punching, by being operatively coupled to a hole punching mechanism. If the operator would like to create a staple bind along the entire spine of the document edge, stapler lever 706 can be configured to slidably move along a repositionable guide rail within cavity 702 to the next position and then actuated as to again insert the appropriate binding staple into the paper stack. This can be sequentially done several times until the desired number of binding staples have been inserted along the spine of the document. Once the document is removed, a slide on, snap on, or adhesively attached cover can be assembled over the staples as to create a higher level of finish even when the document is stapled.

In some embodiments, the staple anvil of stapling assembly 700 which shapes the underside of the staple can be configured in a manner as to enable and secure the slide on or snap on cover. A heavy-duty higher capacity stapling assembly can be inserted additionally or, as an alternative and optionally, be actuated by actuation handle 904 since this handle is more robust and would give the operator more leverage. All manual stapling operations can be achieved by motorized means and be powered by battery DC or plugin AC sources and these types of stapling mechanisms are well known in the marketplace today. Disclosed as unique is a staple means which is assistive where a mechanical stapler is assisted by powered means or stored power means or mechanically actuated stored power means so as to make the enacting and/or initiating of the staple cycle feel familiar but with the added benefit the power assist allows for thicker stacks to be stapled and edge bound.

In embodiments that include a round hole punch function, round hole punch slot 504 is accessible since this is a less complex operation than comb binding and is the next most commonly used binding operation after stapling. After raising punch actuation handle 904 upwards, which in turn rotates actuation mechanism assembly 900 ensuring the punch dies are then in their retracted state (not shown), the operator then places a stack of paper into round hole punch slot 504, and while holding the inserted stack in place and/or allowing the stack to rest against an optional pull-out or wireframe paper stack support assembly, the operator then proceeds to lower punch actuation handle 904 in a downward stroke, which in turn rotates the actuation mechanism 900 to engage the punch dies with the inserted stack of paper to create the desired round punch holes along the spine of the inserted stack of paper. After the punch sequence has been completed, actuation handle 904 then can be raised again sequentially to release the punch die from the paper to allow the paper to be retracted from punch slot 504. As an alternative to the directly engaged punch die to handle actuation, an interim cam-driven mechanism can be utilized to allow paper to be inserted even when actuation handle 904 is in the lowered position, as the handle is raised rotating actuation mechanism 900 which then engages the punch die actuator and on the operator's downstroke action of the actuation handle 904, the punch die is actuated, the paper stack is punched within punch slot 504, and the die is retracted on the same sequential downstroke. This punch actuation sequence uniquely allows the paper stack to be inserted and retracted when the actuation handle 904 is in the lowered position. All manual punching operations can be achieved by motorized means and be powered by battery DC or plug-in AC sources and these types of punching mechanisms are well known in the marketplace today.

Figure 9:
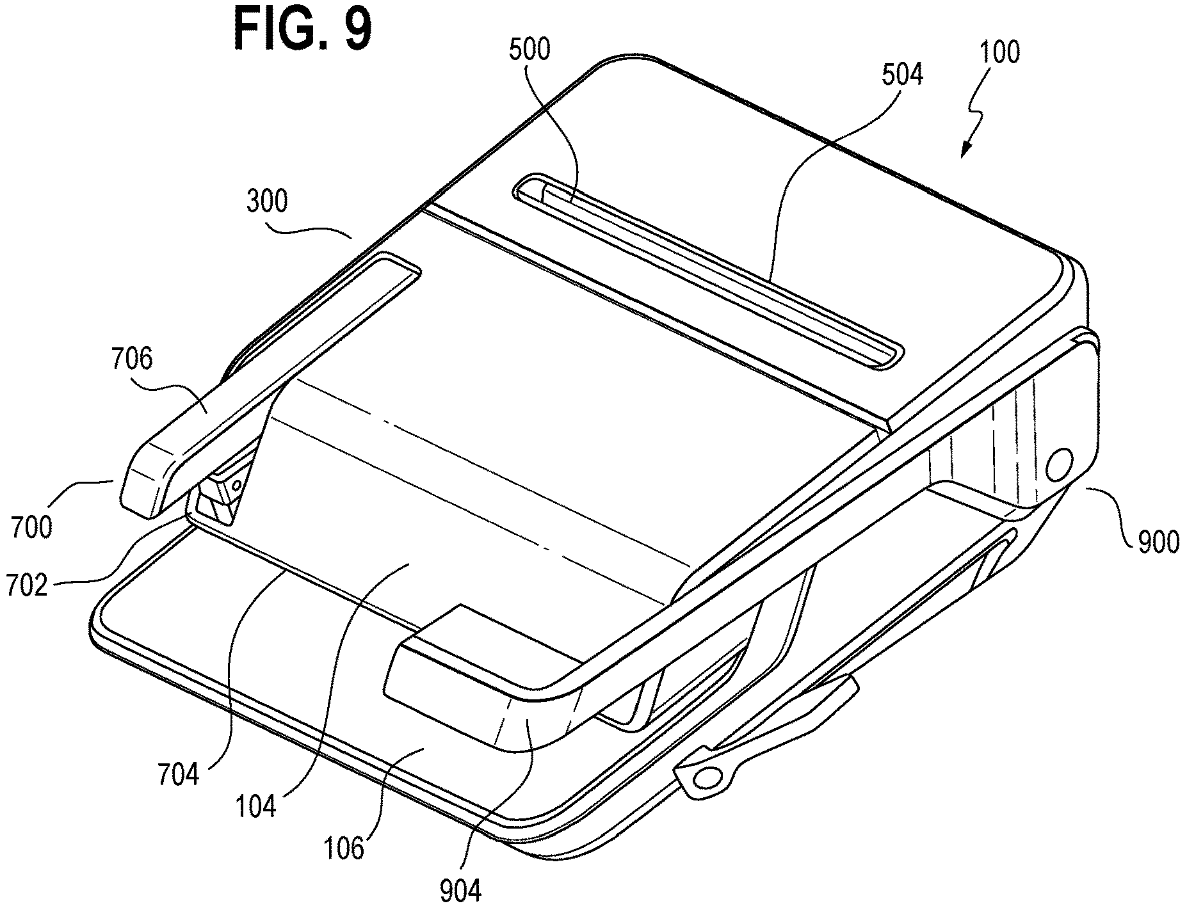
FIG. 9 is a representation of another alternative embodiment of the stated invention utilizing a differing embodiment of the modular and or built-in functional addition or plurality of additions.

FIG. 9 represents another alternative embodiment of the stated invention multi-functional document binding device 100 utilizing an alternate embodiment of the modular and or built-in functional addition or plurality of additions. This particular embodiment of the stated invention discloses stapling assembly 700 residing within accessory cavity 702 of binding device 100 in such a way as to easily identify the mechanism's function since it has the similar signaling elements as the familiar desk top stapler. Similar to the FIG. 8 embodiment, the document binding feature such as a hole punch is not accessible when device lid 104 is in its lowered position, but allows access to the staple assembly 700 and stapler lever 706. When a stack of paper is place against optionally adjustable guide rail 704 and slid into place, stapler lever 706 is operator actuated to insert the appropriate binding staple into the paper stack. If the operator would like to create a staple bind along the entire spine of the document edge, the document is manually moved along adjustable guide rail 704 within the mating cavity created by the lowered device lid 104 and upper cabinet member 106 to the next position, and then staple lever 706 is actuated again to insert the appropriate binding staple into the paper stack. In some embodiments, the stapling action is actuated by actuation handle 904. No matter how actuated, the stapling can be sequentially done several times until the desired number of binding staples have been inserted along the spine of the document. A heavy-duty higher capacity stapling assembly can be inserted additionally or in place of staple assembly 700 with a larger staple lever 706 or converting lever handle or, as another alternative option, be configured to be actuated by actuation handle 904 since this handle is more robust and would give the operator more leverage.

In some embodiments, round hole punch slot 504 is accessible since this is a less complex operation than comb binding and is the next most commonly used binding operation after stapling. However, in other embodiments, only one operation is operable at any one time. The operator places a stack of paper into round hole punch slot 504, and while holding the inserted stack in place and/or allowing the paper stack to rest against an optional pull-out or wireframe paper stack support assembly (currently shown in the retracted or lowered state), the operator then proceeds to lower punch actuation handle 904 in a downward stroke to engage the punching mechanism of the machine.

Figure 10:
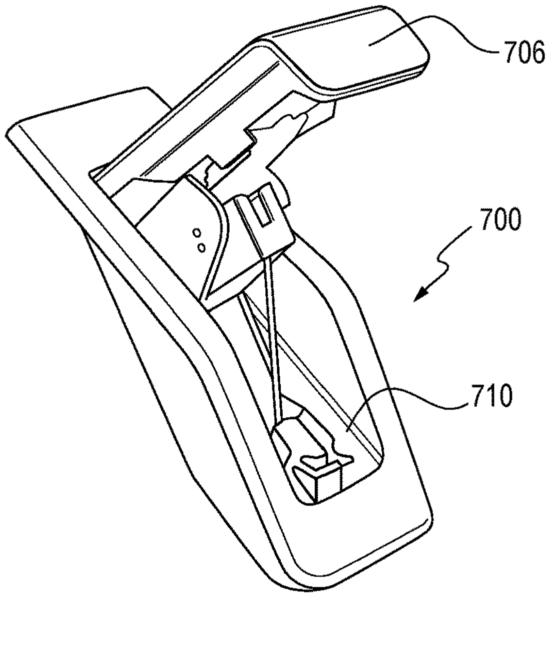
FIG. 10 is a representation of a staple assembly of the present invention including front loading staple refilling to ensure easy installation of refillable staples of varying staple types for varying document thickness capabilities.

FIG. 10 represents staple assembly 700 including front-loading staple refilling to ensure easy installation of refillable staples of varying staple types for varying document thickness capabilities. To refill the unit, staple lever 706 is lifted upwards to access staple sleeve retainer 710. The retainer 710 is designed to accommodate preloaded staple cartridges as well to a standard staple sleeves, to allow for ease of changing staples for specific needs and for refilling purposes. Adjustable guide rail 704 (not shown) allows the paper position relative to the staple to be adjusted and is user configurable. The optionally adjustable guide rail 704 can reside on the upper cabinet member of the unit allowing registration with a significant portion of the document to be staple bound.

Figure 11:
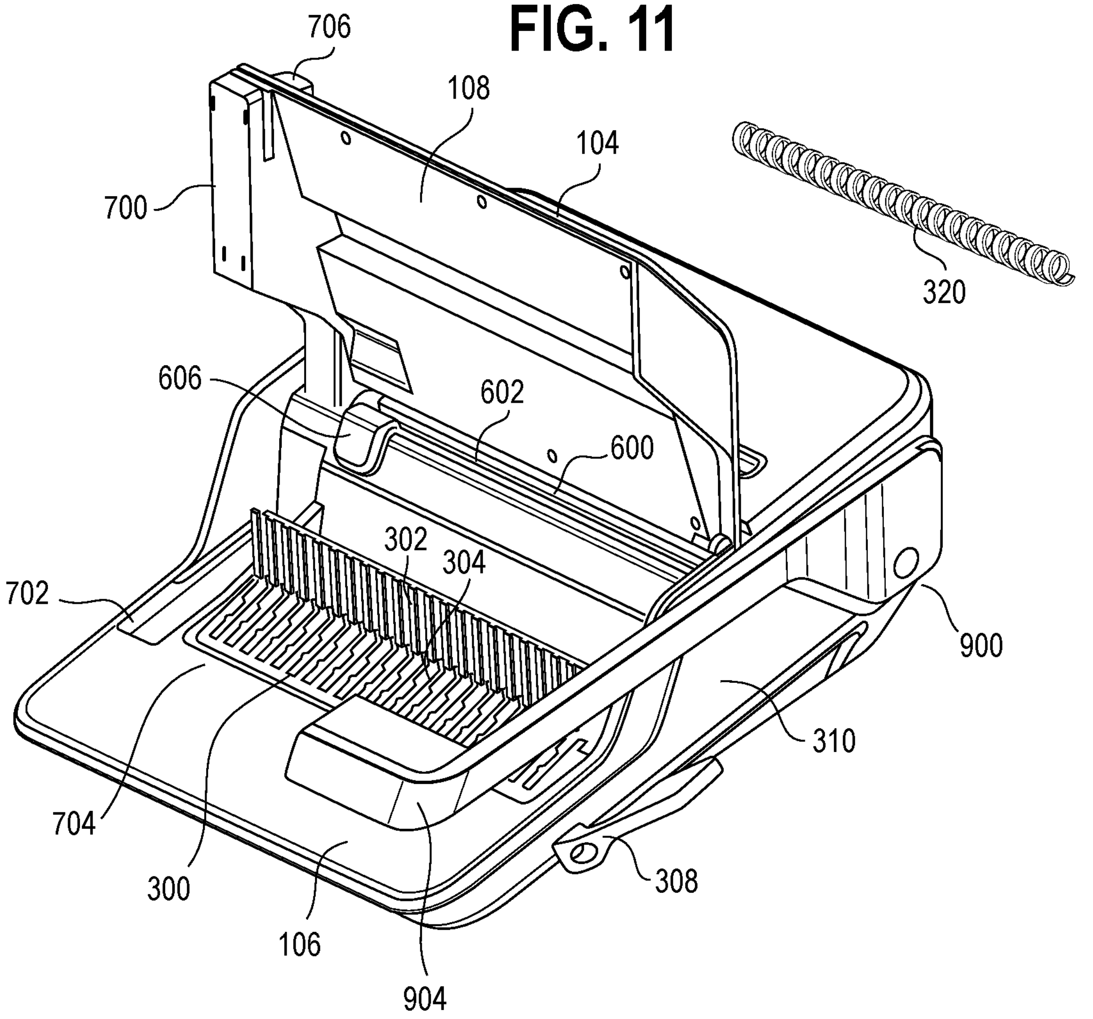
FIG. 11 is a representation of the stated invention staple assembly with device lid in the raised position.

FIG. 11 represents the stated invention multi-functional document binding device 100 with device lid 104 in the raised position. When the operator wants to go into binding mode utilizing the disclosed device, they would reconfigure the device by initially lifting device lid 104 in the raised position. When lifted, staple assembly 700 is also in the raised position to make its functionality momentarily restricted (the staple feature can be configured to be optionally lowered and/or raised free of the lid while still being raised when the lid is raised by the use of resistive detents or pull or slide latch mechanism). This momentary restricted accessibility of staple assembly 700 allows the operator to focus on the steps needed to utilize the comb binding feature by making the other features more difficult to access as compared to the easily or obviously accessible features when the machine has been reconfigured for a particular function of its multi-functions, and/or operationally inaccessible when the machine has been manually or, alternatively, automatically reconfigured to be in an alternative user selected mode.

For example, when the machine is in plastic comb binding mode, device lid 104 is in a raised position and is configured to momentarily block easy access to round hole punch slot 504. This is done to make it easier for the operator to understand binding hole punch slot 602 is the primary punch slot to use when binding. Similarly, in some embodiments, access to the stapler assembly 700 is also blocked. In some embodiments the placement of device lid 104 in the raised position prevents the stapler assembly from being activated. In other embodiments, various features are made less easy to access in order to signal or guide the operator to the correct apparatus to use. Thus, one skilled in the art will recognize that describing a function as "blocked" may have a range of meaning, including making a function or apparatus less easy to access or use.

Furthermore, binding comb storage drawer 310 is allowed to be opened to access the stored binding combs when the device is in the binding configuration. When binding, the operator raises punch lever handle 904 upwards, which in turn rotates actuation mechanism assembly 900 ensuring the punch dies of binding punch assembly 600 are then in their retracted state (not shown), the operator then places a stack of paper into binding hole punch slot 602, and while holding the inserted stack in place and/or allowing the stack to rest against an optional pull-out or wireframe paper stack support assembly, the operator then proceeds to lower punch actuation handle 904 in a downward stroke, which in turn rotates the actuation mechanism 900 to engage the punch dies with the inserted stack of paper to create the desired punch holes along the spine of the inserted stack of paper. After the punch sequence has been complete, actuation handle 904 then can be raised again sequentially to release the punch die from the paper to allow the paper to be retracted from binding hole punch slot 602.

As an alternative to the directly engaged punch die to handle actuation, an interim cam-driven mechanism can be utilized to allow paper to be inserted even when actuation handle 904 is in the lowered position, as the handle is raised rotating actuation mechanism 900 which then engages the binding punch assembly 600's actuator and downstroke of the actuation handle 904, the punch die is actuated, the paper stack is punched within binding hole punch slot 602, and the die is retracted on the same sequential downstroke. This punch actuation sequence uniquely allows the paper stack to be inserted and retracted when the actuation handle 904 is in the lowered position.

All manual punching operations can be achieved by motorized means and be powered by battery DC or plug-in AC sources, and these types of punching mechanisms are well known in the marketplace today.

To punch covers and backs with the proper spacing, cover spacing guide 606 can be utilized to ensure the cover and back pages are punched properly. Typically covers and backs are dimensionally larger than the pages which are to be bound in-between. Spacing guide 606 is designed to move outwards by a preset range (optionally adjustable by the operator) which in turn shifts the alignment of binding hole punch slot 602 in a manner as to accommodate the larger cover and back sheets. As an alternative embodiment, the spacing guide can be configured to return to its default position (non-cover spacing position) after the punching cycle, to ensure the operator engages the spacing guide 606 only as needed and doesn't inadvertently leave it in the incorrect position and create waste due to incorrectly punched pages.

After a cover or back has been punched, or when the operator is ready to bind the pages with a comb, plastic comb 320 can be inserted into binding assembly 300, in this case a comb spreader assembly, (other binding systems would include a metal comb versus plastic comb 320 and the corresponding metal comb holder and crimper, a document clamp and spiral binder spinner, etc.), placing the plastic comb 320 behind and aligned with comb retainer 302 ensuring the comb is engaged with comb prongs 304. Prong lever 308 is pulled towards the front of the machine which in turn slides the comb prongs 304 toward the front of the machine, which then opens or expands plastic comb 320. The operator then places either the previously punched cover or back onto the expanded plastic comb 320, and then the sequentially corresponding pages with the cover or back then being the last one inserted, depending on how the operator has initiated their document stacking order. Once the entire document has been assembled, prong lever 308 is actuated in the reversed direction to release plastic comb 320, allowing it to retract to its natural state securing all the document's pages within.

Figure 12:
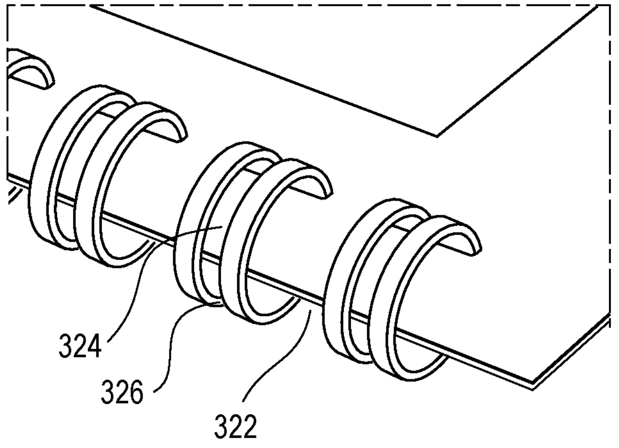
FIG. 12 is a representation of an improved binding comb, in particular a resilient plastic binding comb with unique locking feature.

FIG. 12 represents an improved binding comb, in particular a resilient plastic binding comb with unique locking feature. Plastic combs are manufactured as a resiliently returning shape and therefore after binding can be re-opened with ease, causing some of the resilient comb teeth to release, inadvertently causing pages or portions of pages to not stay retained. We are disclosing a resilient plastic binding comb with a slot feature which adds the functionality of a locking tab to resolve the aforementioned issues with standard binding combs. Binding comb 322 is configured with comb slot 324. The comb slot allows comb locking tab 326 to be easily pushed through comb slot 324. After being pushed through, wing tabs of comb locking tab 326 are configured in such a way to impede the comb locking tab 326 from being reversed out of comb slot 324. Other embodiments would allow for multiple locking tab points, to be able to adjust the comb to a variety of sizes which still allow the bound pages to turn easily and lay flat in spite of the locking tab feature. Another advantage of comb slot 324 is its ability to make the typically easier to use and lower cost plastic binding comb have the look and appearance of a wire-bound document.

Figure 13:
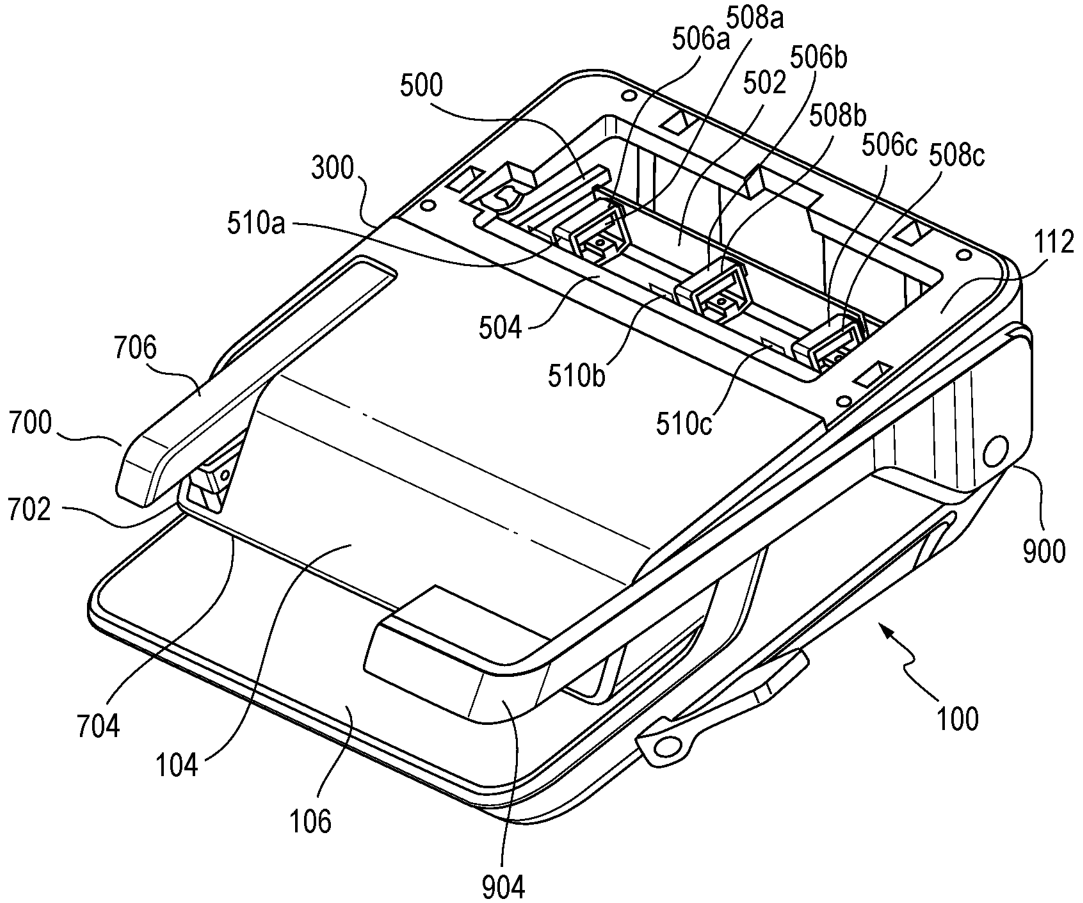
FIG. 13 is an illustration of the disclosed device's punch arrangement and its features in more detail with the upper cabinet access panel has been removed.

FIG. 13 is an illustration of the disclosed device's punch arrangement and its features in more detail. Upper cabinet access panel has been removed to expose round hole punch assembly 500. Round hole punch die assembly 506*a*, 506*b* and 506*c* are retained by assembly rail 502. One or more die assemblies of the die assemblies are slidably mounted onto assembly rail 502. For example, to move die assembly 506*c*, the operator engages die latch 510*c* to release the catch tab from the corresponding notch on assembly rail 502, moving the Die Assembly 506*c* to the desired position releasing the die latch 510*c* to lock the die assembly into place. Assembly rail 502 can be configured with a slidably actuated rail section which would allow one or more of the die assemblies to move in unison, to ease changing and adjusting of the dies to go from a two-hole to three-hole punch, and other possible configurations, and then back again easily. This actuation rail can be operator adjustably modified to adjust the center-to-center alignment and movement range of the attached die assemblies, along with the movement range of the rail itself. This movement allows the mounted die assemblies to move in unison as well as center-to-center variable die spacing in relationship with each other with the movement of the actuation lever for maximum adjustability and reconfigurability. The actuation lever can be configured to be a two-position and/or a multitude of positions. In one embodiment, the slidably actuated rail section's actuation lever or levers would protrude through the upper support shell 112 and the corresponding cover. In another it can reside towards the back, with the actuation lever protruding out the back of the machine or anywhere for ease of accessibility and use.

The foregoing disclosure of specific embodiments is intended to be illustrative of the broad concepts comprehended by the invention.

The invention claimed is:

1. A device for performing operations on sheets of material, the device including:

a housing having a first receiver for sheets of material for a first operation and a second receiver for sheets of material for a second operation, and a lid having a first position and a second position, the first receiver open to receiving sheets when the lid is in the first position, and the second receiver open to receiving sheets when the lid is in the second position, the lid blocking the second receiver from receiving sheets when the lid is in the first position.

2. The device of claim 1 wherein the second operation is performed by a hole punch.

3. The device of claim 2 wherein the hole punch includes a punch die assembly, the punch die assembly including a plurality of dies slidably coupled to an assembly rail, the dies coupled to move in unison when die positions are changed along the assembly rail.

4. The device of claim 1 wherein the second operation is performed by a binding hole punch.

5. The device of claim 4 wherein the second receiver includes a cover spacing guide, the cover spacing guide having a first position to guide a stack of paper, and a second position to guide a cover for the stack of paper, the cover spacing guide moving from the second position to the first position after the binding hole punch is activated.

6. A device for performing operations on sheets of material, the device including:

a housing having a first receiver for sheets of material for a first operation and a second receiver for sheets of material for a second operation, and a lid having a first position and a second position, the first receiver open to receiving sheets when the lid is in the first position, and the second receiver open to receiving sheets when the lid is in the second position, wherein the first operation is performed by a stapler and the second operation is performed by a hole punch.

7. The device of claim 6 further including a drawer within the housing, the drawer being prevented from opening when the lid is in the first position.

8. A device for performing operations on sheets of material, the device including:

a housing having a first receiver for sheets of material for a first operation and a second receiver for sheets of material for a second operation, and a lid having a first position and a second position, the first receiver open to receiving sheets when the lid is in the first position, and the second receiver open to receiving sheets when the lid is in the second position, wherein the first receiver is a slot bounded by the lid and a surface of the housing when the lid is in the first position.

9. A device for performing operations on sheets of material, the device including:

a housing having a first receiver for sheets of material for a first operation and a second receiver for sheets of material for a second operation, and a lid having a first position and a second position, the first receiver open to receiving sheets when the lid is in the first position, and the second receiver open to receiving sheets when the lid is in the second position, wherein the first operation is actuated by an actuator at a first time, and the second operation is actuated by the actuator at a second time.

10. A device for performing binding operations on sheets of material, the device including:

a housing, a lid, a first slot for receiving stacks of material to be bound, and a second slot for receiving material to be punched, the lid obstructing the second slot when the lid is in a closed position, and exposing the second slot when the lid is in an open position.

11. The device of claim 10 wherein the lid includes a recess, a stapler positioned in the recess.

12. The device of claim 10 further including:

a stapler in communication with the first slot, a hole punch assembly in communication with the second slot, and an actuator coupled to the stapler to actuate stapling and also coupled to the hole punch assembly to actuate punching.

13. The device of claim 12 wherein the actuator actuates the hole punch when the lid is in the open position.

14. The device of claim 12, the hole punch including a punch die assembly, the punch die assembly including a plurality of dies slidably coupled to an assembly rail, the dies coupled to move in unison when die positions are changed along the assembly rail.

15. The device of claim 10 further including a drawer in the housing, the drawer being openable when the lid is in the open position, and not being openable when the lid is in the closed position.

16. The device of claim 10, wherein the second slot includes a guide for positioning the sheets of material in the slot, the guide including a first position and a second position, the guide being movable from the first position to the second position by a user, the guide moving back to the first position upon punching of the sheets of material in the slot and removal of the sheets of material from the slot.

17. A device for binding sheets of material, the device including:

a housing, a lid having an open position and a closed position, a first slot in communication with an assembly for a first operation on the sheets of material, a second slot in communication with an assembly for a second operation on the sheets of material, and a third slot in communication with an assembly for a third operation on the sheets of material, the lid and portion of the housing forming the first slot, the lid closing the second slot when in the closed position, and the third slot being blocked by the lid when the lid is in an open position.

18. The device of claim 17 wherein the assembly for the first operation, the assembly for the second operation, and the assembly for the third operation are all actuated by a same actuator.

19. The device of claim 18 wherein the actuator acts to actuate the first assembly when the lid is in the closed position, and the actuator acts to actuate the second assembly when the lid is in the open position.

20. A device for performing operations on sheets of material, the device including:

a housing having a first receiver for sheets of material for a first operation and a second receiver for sheets of material for a second operation, and a lid having a first position and a second position, the first receiver open to receiving sheets when the lid is in the first position, and the second receiver open to receiving sheets when the lid is in the second position, the lid blocking the second receiver from receiving sheets when the lid is in the first position, further including a drawer within the housing, the drawer being prevented from opening when the lid is in the first position.

* * * * *